United States Patent
Spicer et al.

(10) Patent No.: US 12,060,962 B2
(45) Date of Patent: Aug. 13, 2024

(54) PLUMBING FIXTURES FOR A SPA

(71) Applicant: Strong Industries, Inc., Northumberland, PA (US)

(72) Inventors: Wade Spicer, Northumberland, PA (US); Charles Woods, West Manchester, OH (US); William Denning, Pine Grove, PA (US); Nathan Long, Middleburg, PA (US)

(73) Assignee: STRONG INDUSTRIES, INC., Northumberland, PA (US)

( * ) Notice: Subject to any disclaimer, the term of this patent is extended or adjusted under 35 U.S.C. 154(b) by 0 days.

(21) Appl. No.: 17/126,915

(22) Filed: Dec. 18, 2020

(65) Prior Publication Data

US 2021/0190239 A1    Jun. 24, 2021

Related U.S. Application Data

(60) Provisional application No. 62/951,223, filed on Dec. 20, 2019.

(51) Int. Cl.
| | | |
|---|---|---|
| *F16L 5/10* | (2006.01) | |
| *E04H 4/00* | (2006.01) | |
| *E04H 4/12* | (2006.01) | |

(52) U.S. Cl.
CPC .............. *F16L 5/10* (2013.01); *E04H 4/0037* (2013.01); *E04H 4/12* (2013.01)

(58) Field of Classification Search
CPC .......... F16L 5/10; F16L 37/26; E04H 4/0037; E04H 4/12
USPC ............................................... 4/492; 285/325
See application file for complete search history.

(56) References Cited

U.S. PATENT DOCUMENTS

| 160,700 | A | * | 3/1875 | Painter | ..................... | F16L 37/26 |
| | | | | | | 285/349 |
| 344,312 | A | * | 6/1886 | Guillemin | ............... | F16L 37/26 |
| | | | | | | 285/349 |
| 360,779 | A | * | 4/1887 | Moss | ...................... | F16L 37/26 |
| | | | | | | 285/354 |

(Continued)

FOREIGN PATENT DOCUMENTS

| CN | 207 701 799 U | 8/2018 |
| DE | 85 13 518 U1 | 6/1985 |

(Continued)

OTHER PUBLICATIONS

International Search Report from corresponding PCT application No. PCT/US2020/066022 dated Feb. 5, 2021.

(Continued)

*Primary Examiner* — David P Angwin
*Assistant Examiner* — William R Klotz
(74) *Attorney, Agent, or Firm* — Grogan, Tuccillo & Vanderleeden LLP

(57) ABSTRACT

A through bulkhead connector for a spa includes a first fitting member and a second fitting member slidably connected to the first fitting member. The first fitting member includes a flange and an adapter portion extending from the flange and defining a passageway through the adapter portion and flange. The flange includes a receiving slot formed therein and which is open at one end for receiving a correspondingly shaped and dimensioned portion of the second fitting member.

16 Claims, 25 Drawing Sheets

(56) References Cited

U.S. PATENT DOCUMENTS

| | | | | |
|---|---|---|---|---|
| 516,481 | A * | 3/1894 | Emerson | F16L 37/26 285/425 |
| 823,346 | A * | 6/1906 | Maxwell | F16L 37/26 285/349 |
| 1,173,061 | A * | 2/1916 | Tregloune | F16L 37/0841 285/317 |
| 1,592,093 | A * | 7/1926 | Foucault | F16L 37/26 285/325 |
| 1,863,978 | A * | 6/1932 | Foucault | F16L 19/0218 285/349 |
| 1,916,930 | A * | 7/1933 | Lyness | F16L 13/11 285/374 |
| 2,279,733 | A * | 4/1942 | Cross | F16L 17/067 285/100 |
| 2,286,105 | A * | 6/1942 | Quinn | F16L 37/26 285/332 |
| 3,869,000 | A | 3/1975 | English | |
| 4,971,368 | A * | 11/1990 | Wood | F04B 39/123 277/606 |
| 5,466,016 | A * | 11/1995 | Briody | B60K 15/04 220/86.2 |
| 5,700,041 | A * | 12/1997 | Andre | F16L 37/26 285/349 |
| 5,788,291 | A * | 8/1998 | Williams | F16L 37/26 285/325 |
| 5,850,640 | A | 12/1998 | Pinciaro | |
| 5,920,924 | A | 7/1999 | Pinciaro | |
| 6,412,123 | B1 | 7/2002 | Lau | |
| 7,488,007 | B2 * | 2/2009 | Weber | F04D 29/607 285/330 |
| 8,079,620 | B1 * | 12/2011 | Weber | F04D 29/606 285/330 |
| 8,398,121 | B2 * | 3/2013 | Lotti | F16L 33/227 285/308 |
| 9,295,825 | B2 * | 3/2016 | Biddell | F16L 37/26 |
| 9,597,258 | B2 | 3/2017 | Force et al. | |
| 9,995,253 | B2 * | 6/2018 | Tucker | F16L 23/12 |
| 10,918,568 | B2 * | 2/2021 | Backer | F16L 33/035 |
| 2004/0194203 | A1 | 10/2004 | Pinciaro | |
| 2014/0102634 | A1 * | 4/2014 | Harder | B29C 33/0033 156/253 |
| 2016/0355970 | A1 * | 12/2016 | Federico | D06F 58/20 |
| 2019/0290540 | A1 | 9/2019 | Backer | |
| 2020/0173590 | A1 * | 6/2020 | Bartolo | F16L 37/26 |

FOREIGN PATENT DOCUMENTS

| | | | | |
|---|---|---|---|---|
| EP | 4076333 | | 10/2022 | |
| GB | 969837 | A * | 9/1964 | F16L 17/067 |
| GB | 2160942 | A * | 1/1986 | E03C 1/084 |
| WO | 20211127444 | | 6/2021 | |

OTHER PUBLICATIONS

Canadian Office Action dated Sep. 6, 2023 from corresponding Canadian Application No. 3162066.

Supplementary European Search Report dated Dec. 7, 2023 from corresponding European Application No. EP 20902775.

* cited by examiner

PLUMBING FIXTURES FOR A SPA

CROSS-REFERENCE TO RELATED APPLICATIONS

This application claims the benefit of U.S. Provisional Application Ser. No. 62/951,223, filed on Dec. 20, 2019, which is hereby incorporated reference herein in its entirety.

FIELD OF THE INVENTION

The present invention relates generally to spas and plumbing fixtures therefor and, more particularly, to bulkhead connectors for a spa.

BACKGROUND OF THE INVENTION

Spas, also commonly known as hot tubs, are popular fixtures that are used in many homes. They generally include a deep, vacuum formed tub having a smooth acrylic liner that is filled with heated water and which is used for soaking and relaxation. Spas typically include water jets for therapeutic and massage purposes.

Typically, the acrylic liner is formed into shapes that provide a variety of seating arrangements within the tub. Each seat is usually equipped with hydrotherapy jets that allow a pressurized flow of water to be directed at various parts of a user's body. The water flow may be aerated for additional effect, and some or all of the jets may also automatically move or rotate, causing the changing pressure of the water on the body to provide a massage-like effect. A typical spa may include anywhere from 30-120 or more water jets, and construction of the spa requires cutting 30-120 holes in the acrylic liner to accommodate the jets. Once the cutouts for the jets have been made, jet assemblies must be placed in each cutout, which includes placing a gasket between a wall fitting of the jet assembly and the interior surface of the tub, providing the wall fitting through the cutout, and threading a jet valve body onto the wall fitting from the back of the tub such that the wall fitting and the jet valve body sandwich the tub wall. A bead of caulk is utilized to seal the jet valve body to the back of the tub wall.

Notably, however, spas with this type of jet system are extremely costly and time consuming to manufacture, and may be prone to leaking. In particular, each jet assembly, each fitting on each jet assembly for the water and air lines, and each connection to the water manifold is a potential leak point. As will be readily appreciated, this presents upwards of 360 or more possible places in the spa that leaks may occur. From a business standpoint, therefore, spas are extremely time consuming and costly to manufacture due to the manual labor necessary to install each individual jet assembly and the dedicated water and air supply lines for each jet. Moreover, repair and warranty costs are often a concern, mostly due to the high number of potential leakage points, as discussed above.

In an effort to address these issues, modular hydrotherapy systems have been developed. In such systems, the acrylic shell is constructed with depressions or hollows in the shell wall. Each of the hollows is fitted with a jet pack module on which jets or nozzles are mounted for injecting water and/or air into the interior of the spa shell. Each jet or nozzle may be connected to an air or water manifold of the jet pack module, and the manifolds are configured for fluid connection with primary water and air supply lines. Such jet pack modules therefore only require a single water supply connection and/or a single air supply connection for each seating position (i.e., a single connection between the primary water supply and the water manifold of the jet pack provides water to all of the jets on the jet pack module; similarly, a single connection between the primary air supply and the air manifold of the jet pack provides air to all of the jets on the jet pack module). Such a system also ensures that any leaks from the jets are contained within the interior volume of the spa shell, not behind the shell. This construction also allows the spa to be upgraded or repaired with new jets by an easy replacement of the jet pack module with a new one having the same or different jets.

In connection with the above, there is a need for specialized plumbing fixtures, namely, through bulkhead connectors, that facilitate fluid connection of each modular jet pack to the primary water and air supply lines of the spa.

SUMMARY OF THE INVENTION

It is an object of the present invention to provide fitting for a spa.

It is another object of the present invention to provide through bulkhead connectors for a spa.

It is another object of the present invention to provide through bulkhead connectors for a spa than enable the connection of modular jet packs to primary air and water supply lines of the spa.

These and other objects are achieved by the present invention.

According to an embodiment of the present invention a through bulkhead connector for a spa includes a first fitting member and a second fitting member. The first fitting member has a flange and an adapter portion extending from the flange and defining a first passageway through the adapter portion and flange, and a slot in the flange. The second fitting member is slidably receivable in the slot in the flange of the first fitting member and has a generally cylindrical body portion defining a second passageway through the second fitting member. When the second fitting member is slidably connected to the first fitting member, the first passageway and the second passageway are in alignment with one another to allow for fluid flow through the first fitting member and the second fitting member.

According to another embodiment of the present invention, a spa includes a shell configured to contain a volume of water, a water supply manifold positioned behind the shell, a jet pack having an array of nozzles for directing pressurized jets of water and/or air into the volume of water, and a through bulkhead connecter extending through the shell and fluidly interconnecting the water supply manifold with the jet pack.

According to yet another embodiment of the present invention, a through bulkhead connector for a spa includes a first fitting element having a hollow body portion and an annular flange extending from the body portion, and a grommet receivable on the body portion and having an annular flange. The grommet is receivable in an aperture in the shell of the spa such that the annular flange of the grommet forms a fluid-tight seal with the shell and such that the grommet forms a fluid-tight seal with the body portion.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
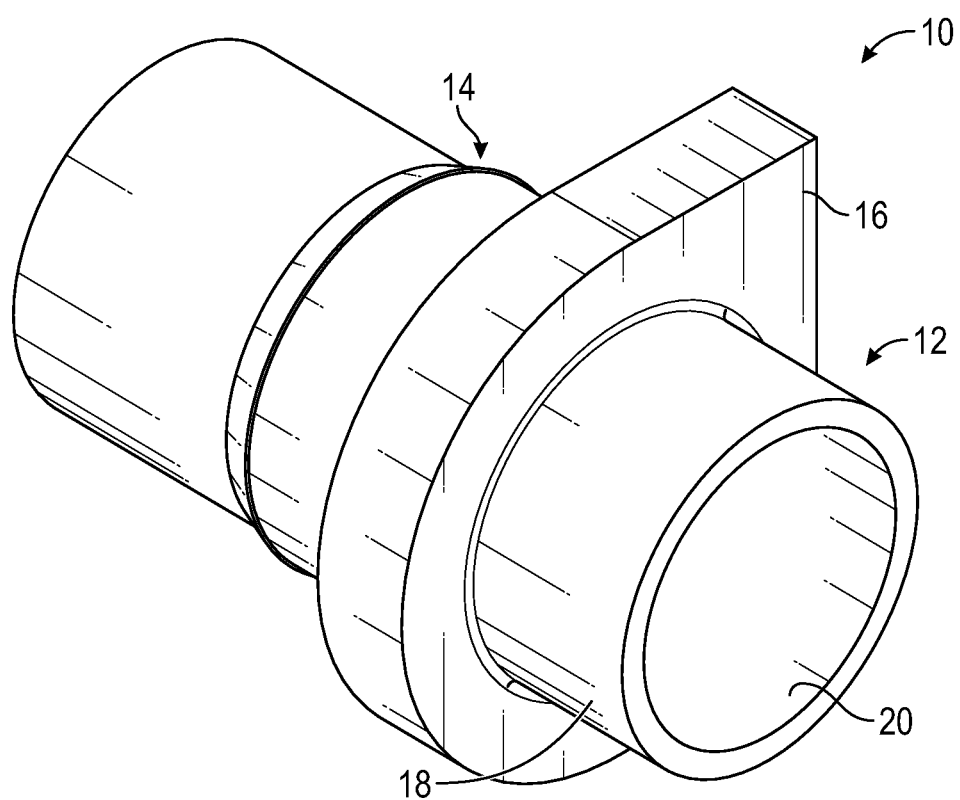
FIG. 1 is a front perspective view of a through bulkhead connector according to an embodiment of the present invention.
Figure 2:
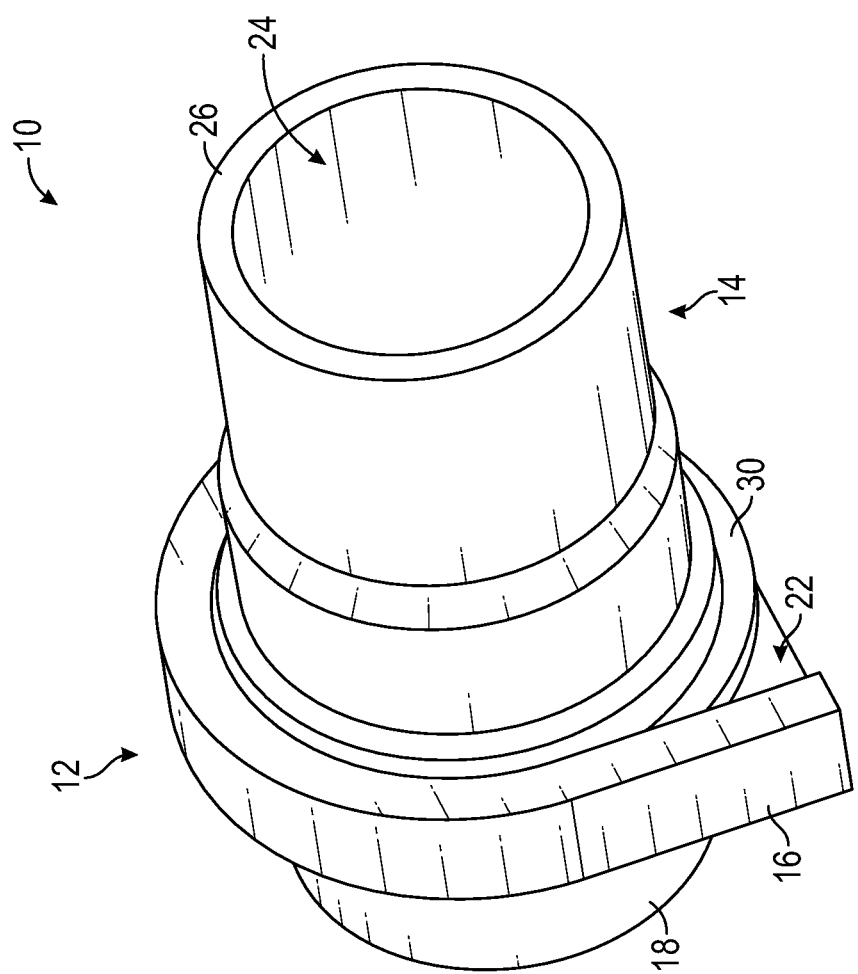
FIG. 2 is a rear perspective view of the through bulkhead connector of FIG. 1.
Figure 3:
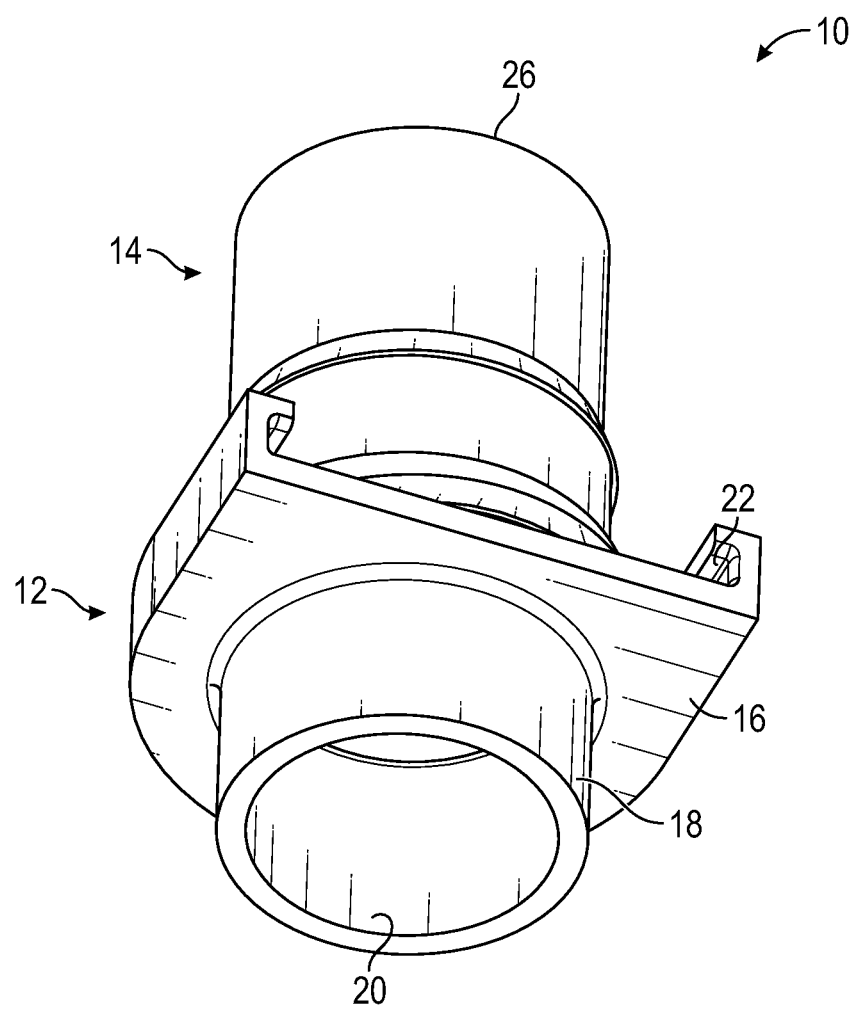
FIG. 3 is another perspective view of the through bulkhead connector of FIG. 1.
Figure 4:
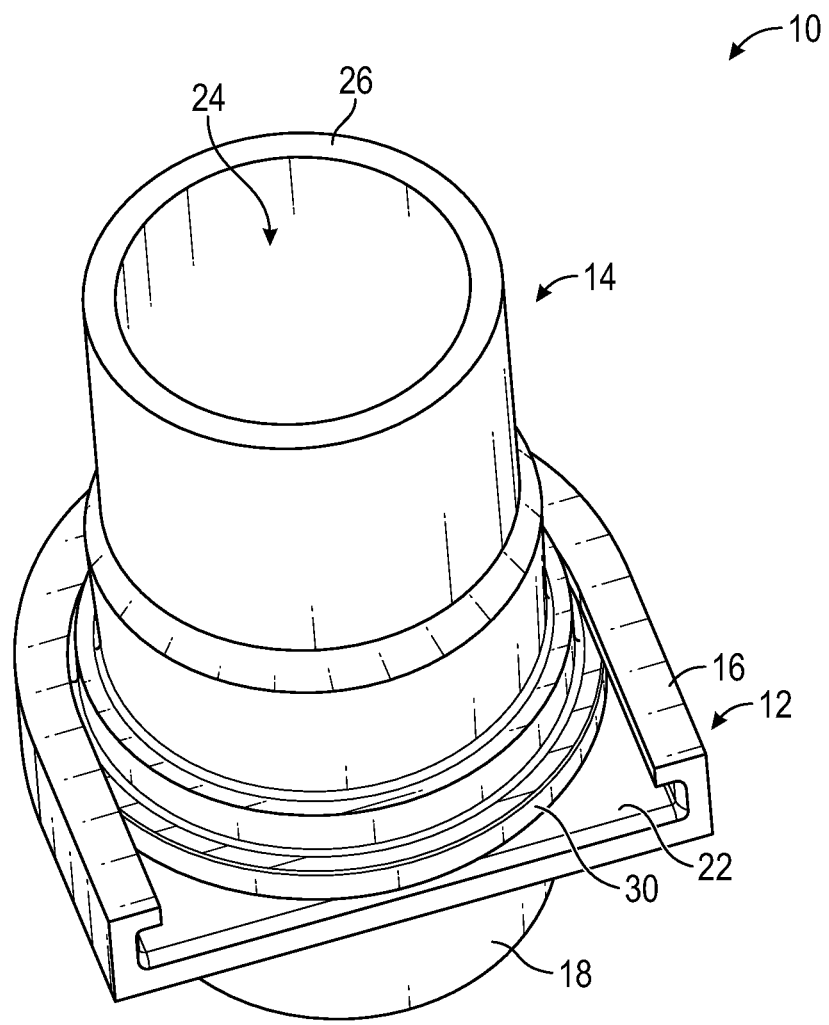
FIG. 4 is yet another perspective view of the through bulkhead connector of FIG. 1.
Figure 5:
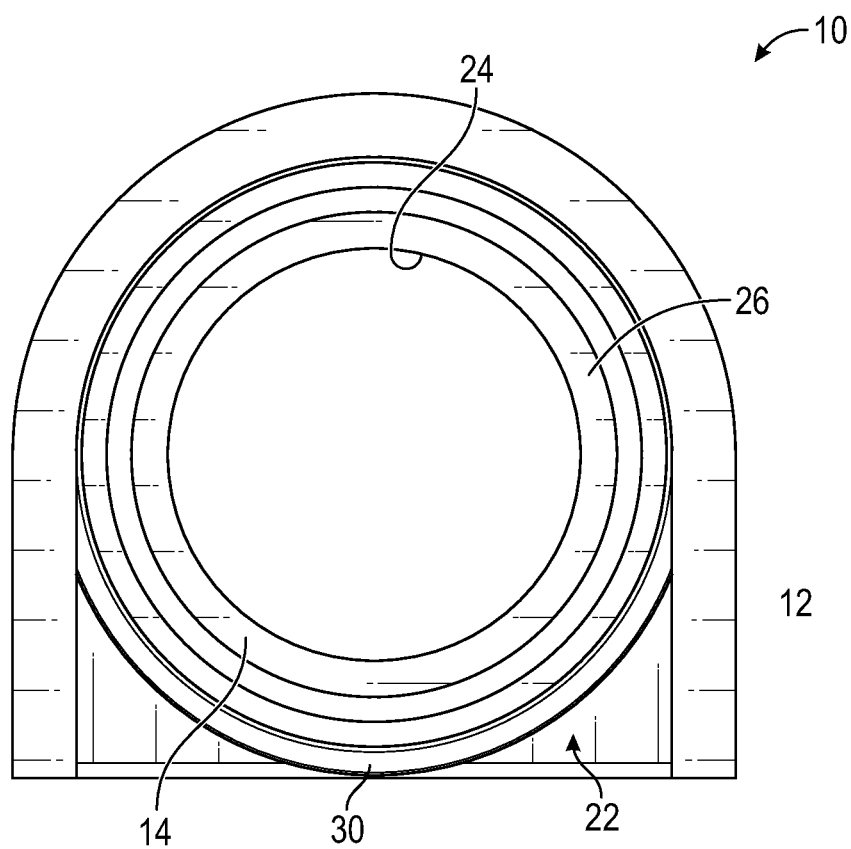
FIG. 5 is an end elevational view of the through bulkhead connector of FIG. 1.
Figure 6:
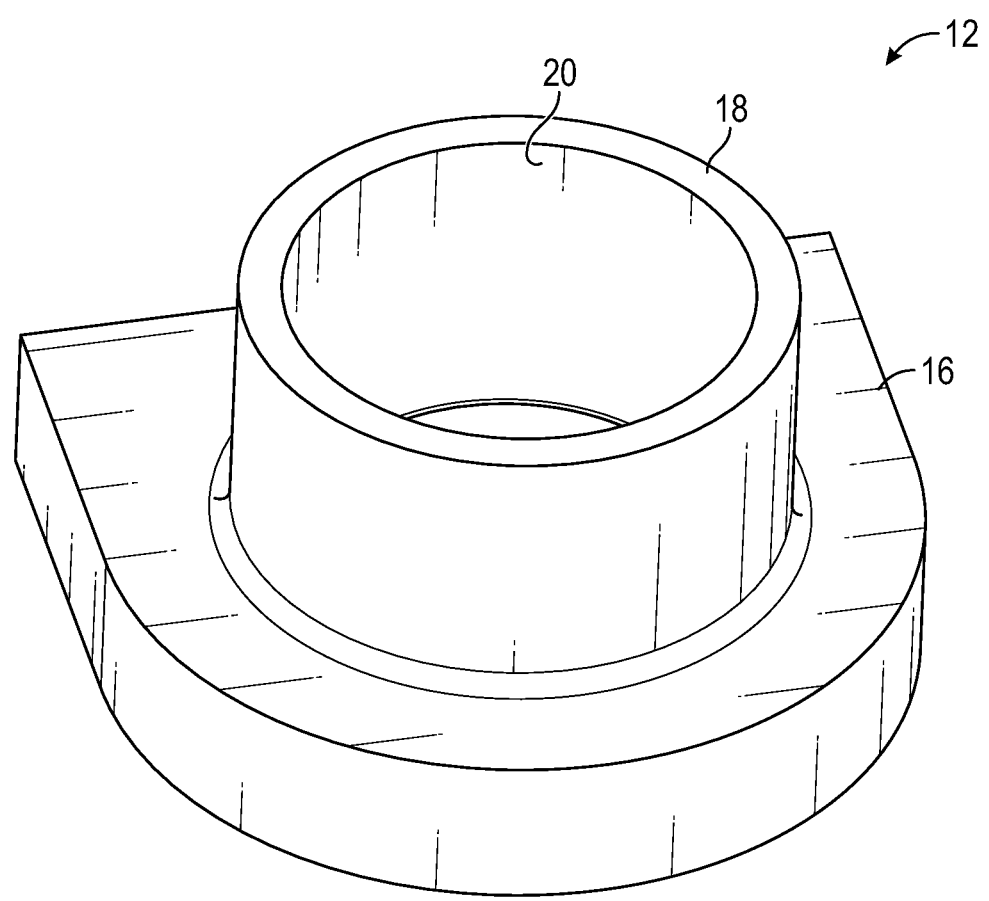
FIG. 6 is a front perspective view of a first fitting of the through bulkhead connector of FIG. 1.
Figure 7:
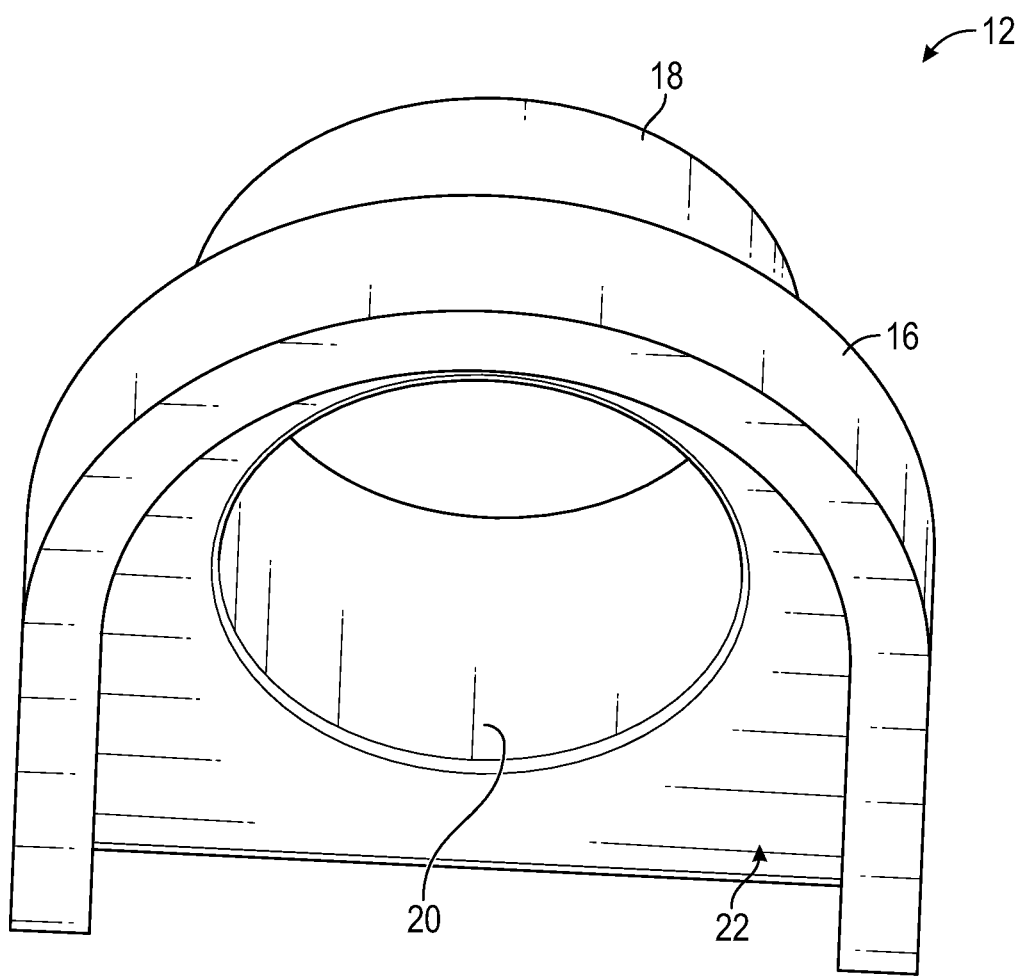
FIG. 7 is a rear perspective view of the first fitting.
Figure 8:
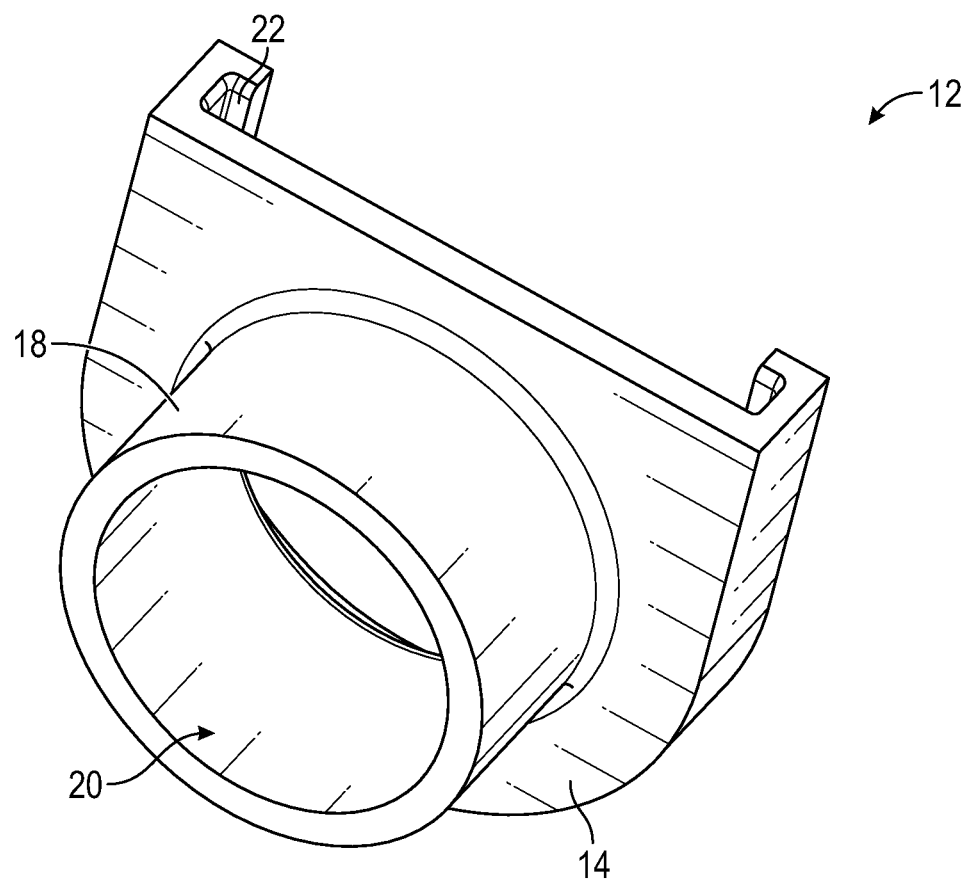
FIG. 8 is another perspective view of the first fitting.
Figure 9:
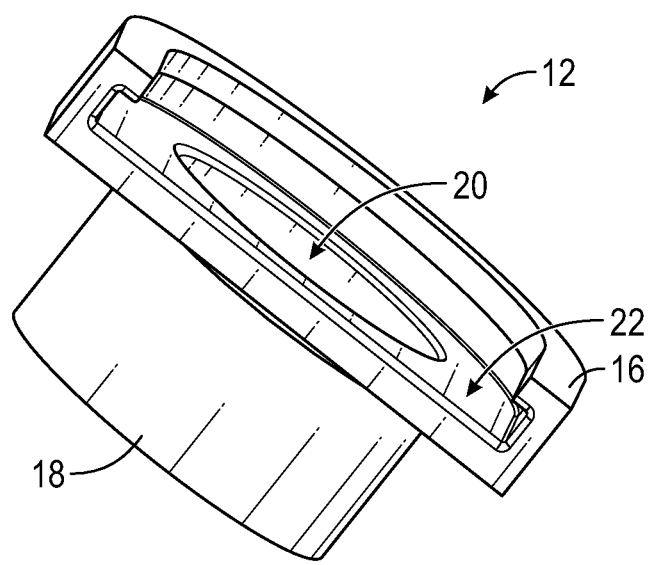
FIG. 9 is another perspective view of the first fitting, illustrating a receiving slot thereof.

Referring to FIGS. 1-5, a through bulkhead connector 10 according to one embodiment of the present invention is illustrated. As illustrated therein, the through bulkhead connector 10 includes a first fitting member 12 and a second fitting member slidably connected to the first fitting member 12. As best shown in FIGS. 6-9, the first fitting member 12 includes a flange 16 and a generally cylindrical, hollow adapter portion 18 extending from the flange 16 and defining a passageway 20 through the adapter portion 18 and flange 16. In an embodiment, the flange is generally U-shaped, although other configurations are possible without departing from the broader aspects of the invention. With particular reference to FIGS. 8 and 9, the flange 16 includes a receiving slot 22 formed therein and which is open at one end for receiving a correspondingly shaped and dimensioned portion of the second fitting member 14, as discussed in detail below.

Figure 10:
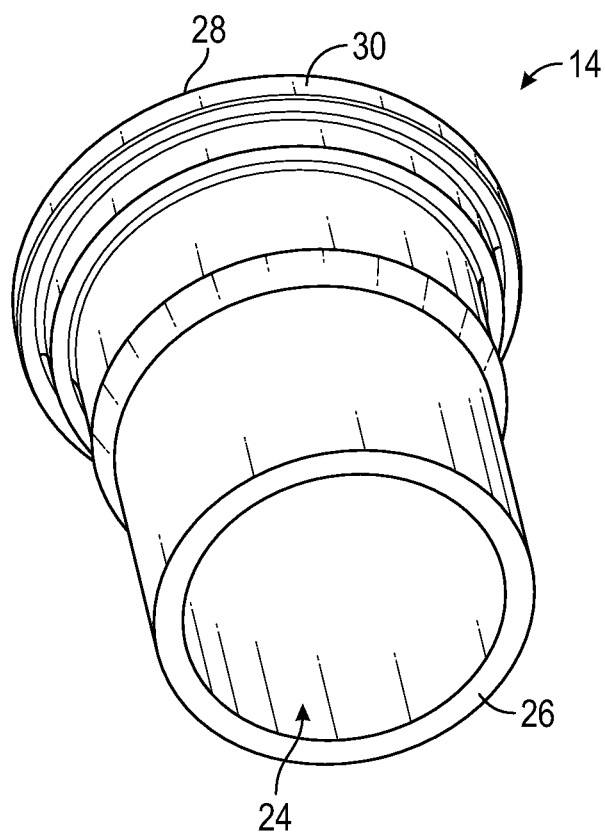
FIG. 10 is a perspective view of a second fitting of the through bulkhead connector of FIG. 1.
Figure 11:
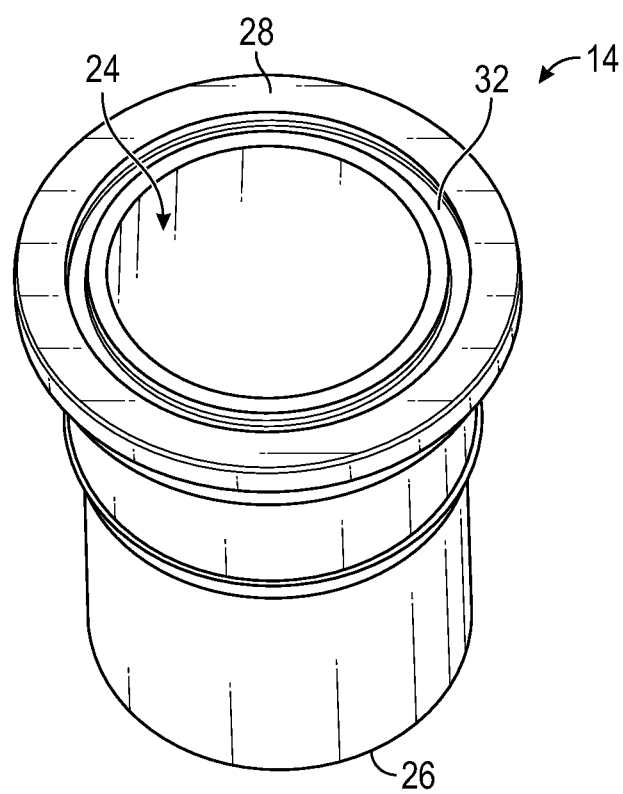
FIG. 11 is a rear perspective view of the second fitting.
Figure 12:
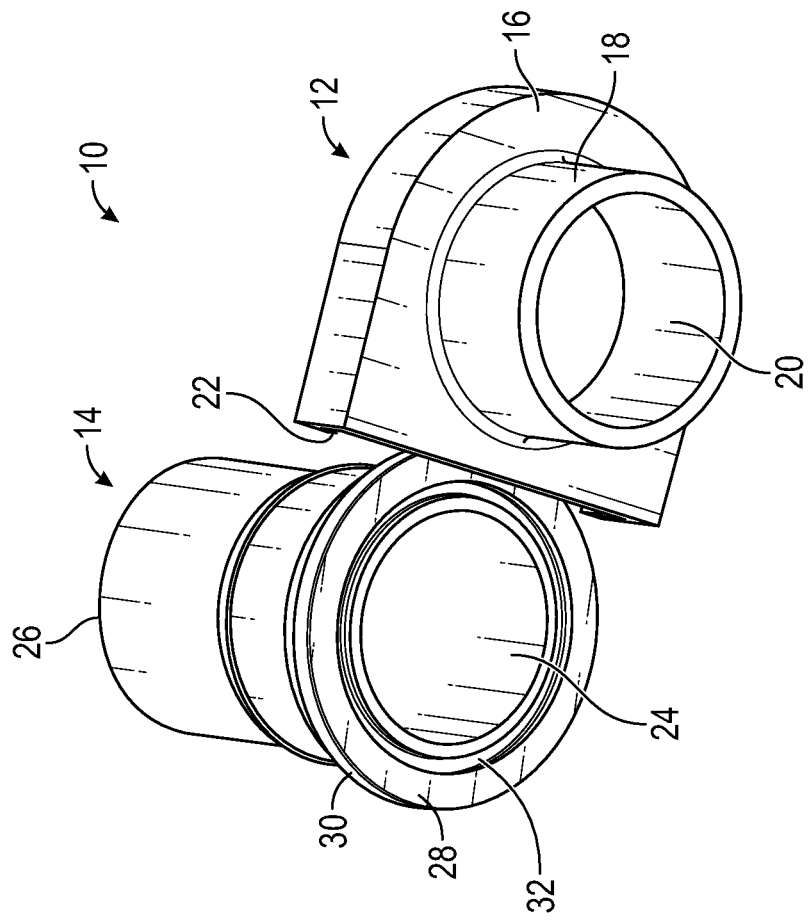
FIG. 12 is a front perspective view of the through bulkhead connector of FIG. 1, showing coupling of the first fitting with the second fitting.
Figure 13:
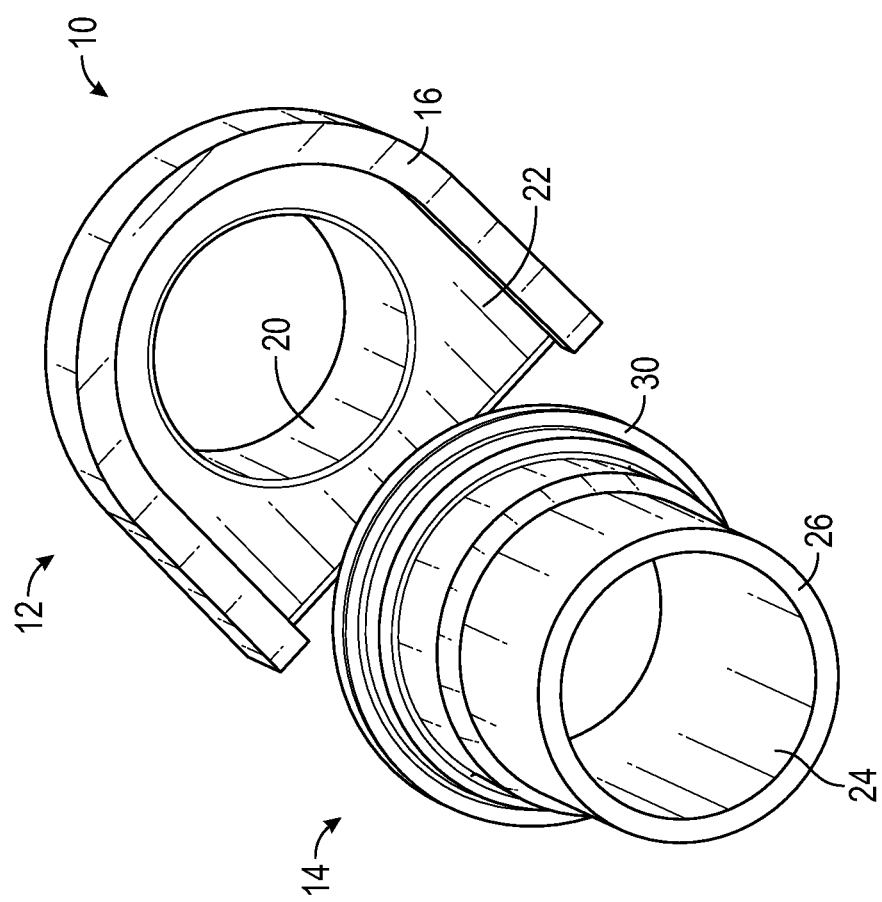
FIG. 13 is a rear perspective view of the through bulkhead connector of FIG. 1, showing coupling of the first fitting with the second fitting.
Figure 14:
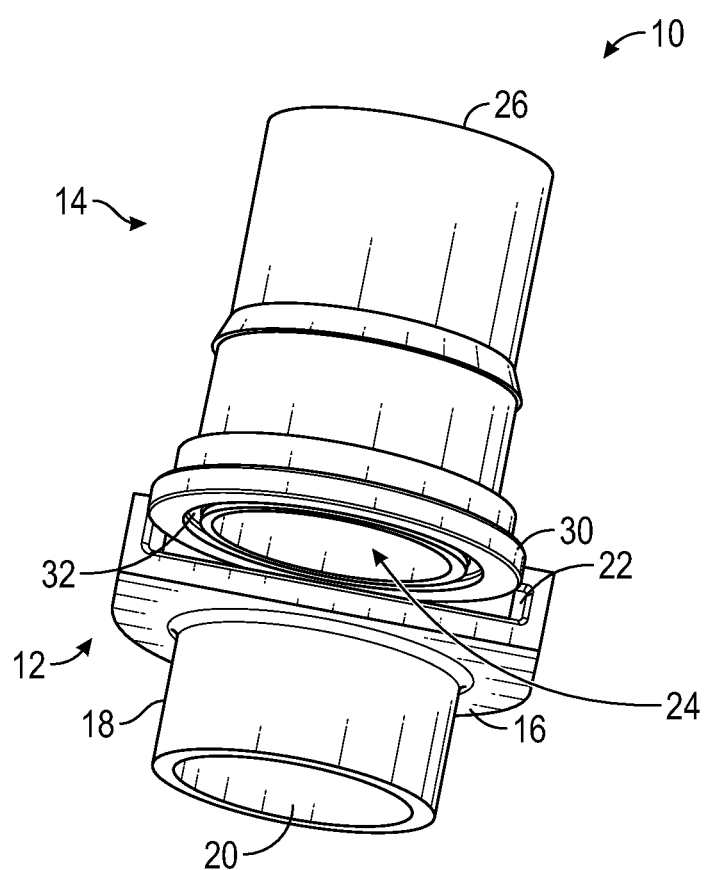
FIG. 14 is another perspective view of the through bulkhead connector of FIG. 1, showing coupling of the first fitting with the second fitting.
Figure 15:
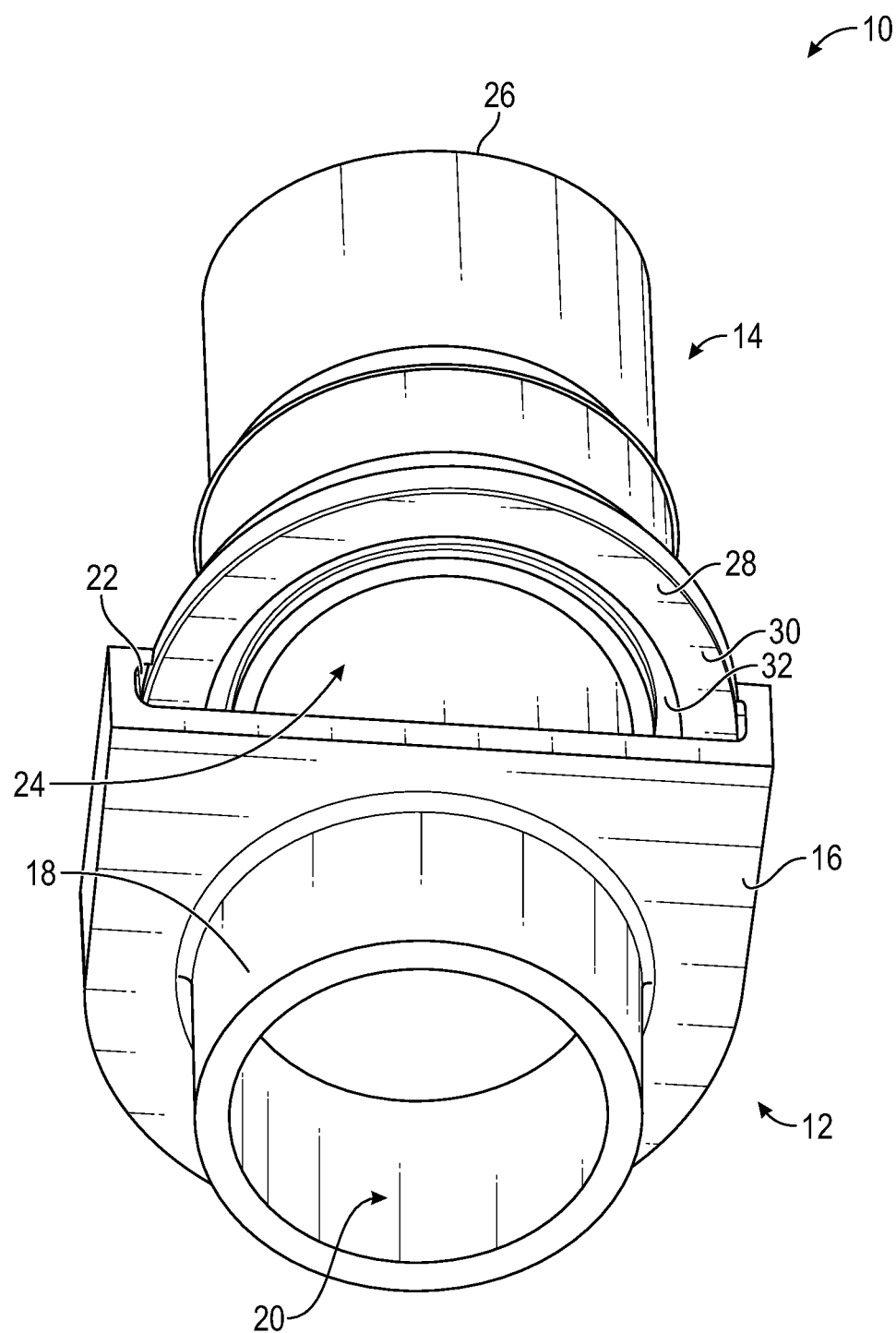
FIG. 15 is another perspective view of the through bulkhead connector of FIG. 1, showing coupling of the first fitting with the second fitting.
Figure 16:
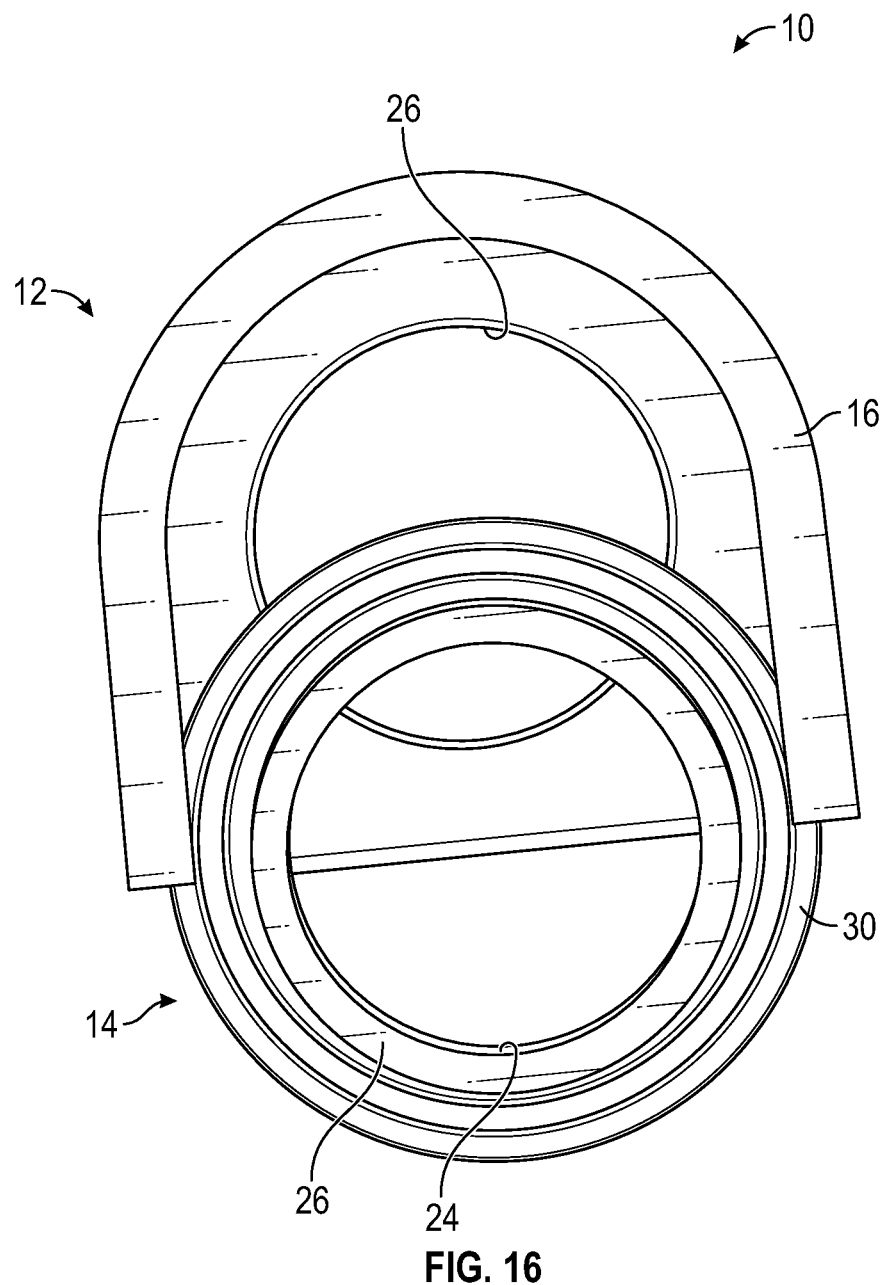
FIG. 16 is an end elevational view of the through bulkhead connector of FIG. 1, showing coupling of the first fitting with the second fitting.
Figure 17:
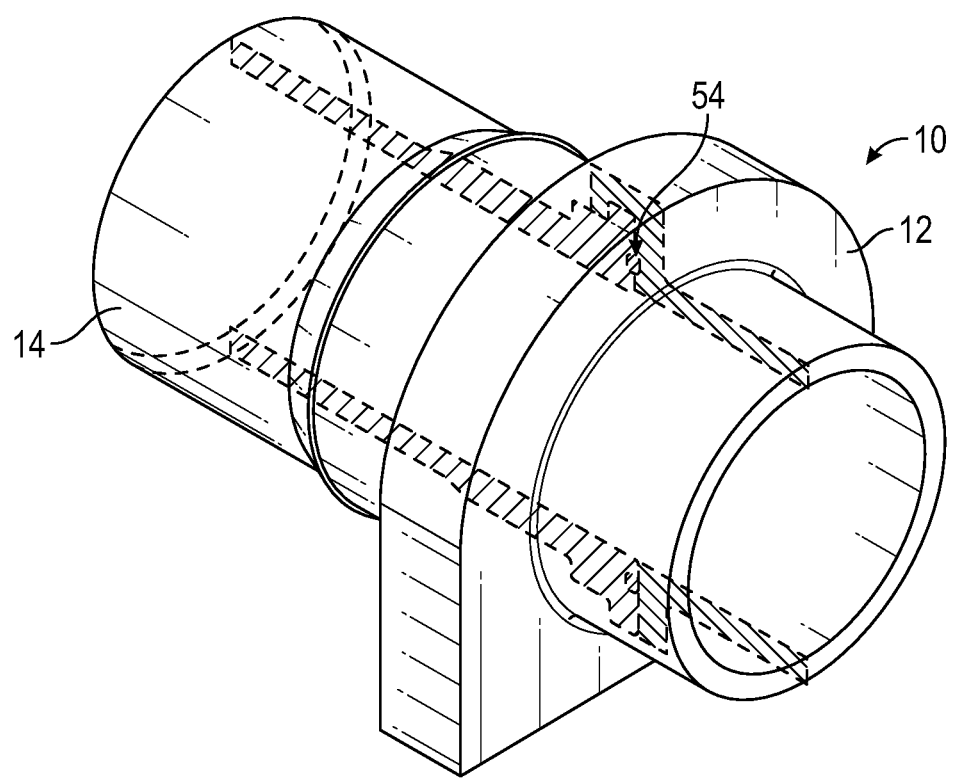
FIG. 17 is a perspective, transparent view of the through bulkhead connector of FIG. 1.

As illustrated in FIGS. 10 and 11, the second fitting member 14 is generally cylindrical shape and has a hollow passageway 24 extending therethrough from a first end 26 to a second end 28. The second end 28 of the fitting, as shown in FIG. 10, has an enlarged diameter shoulder portion 30 that is dimensioned so as to be slidably received in the slot 22 in the flange 16 of the first fitting 12. As shown in FIG. 11, the face of the second end 28 includes an annular recess or channel 32 configured to receive a resilient sealing element such as an O-ring 54 (not shown in FIGS. 10 and 11).

Turning now to FIGS. 12-16, the second fitting member 14 may be selectively and removably connected to the first fitting member 12 by sliding the enlarged shoulder portion 30 of the second fitting member 14 into the slot 22 in the flange 16 of the first fitting 12. Once connected, the passages 20, 24 of the first and second fitting members 12, 14 are aligned in the axial direction to form a continuous flowpath therethrough. The configuration of the flange 16 and slot 22, and the complimentary shoulder portion 30, are such that the first fitting member 12 and the second fitting member 14 cannot be decoupled by pulling them apart in the axial direction. Rather, they can only be decoupled by sliding the first fitting 12 in a direction substantially orthogonal to an axis extending through the passageway such that the enlarged shoulder portion 30 slides out of the slot 22 in the flange 16.

Importantly, the bulkhead connector 10 of the present invention is specifically designed to allow for the quick and easy connection of a hot tub or spa jet pack to a water supply manifold positioned behind the wall or shell of a hot tub, as disclosed hereinafter. As is known in the art, a jet pack includes a plurality of water and/or air jets that are configured to direct pressurized water into the interior of the spa or hot tub when positioned within a seating position of the spa shell. In particular, rather than necessitating an array of jets for water and/or air to be formed in the spa shell, as is customary in the art, a single water supply line and a single air supply line may be associated with each seating position in the spa, and the plurality of air and/or water nozzles instead form part of the jet pack. Water and air are supplied to the jet pack at each seating position via the single air and water lines, and the water and air supplied to the jet packs jet packs then exits the nozzles in the front face of the jet pack and provides therapeutic benefit for a user. As is known in the art, the use of jet packs within each seating position substantially decreases the number of cutouts necessary in the spa shell, thus decreasing the number of potential leak points. In some cases, the use of jet packs may also allow different jet packs to be swapped out easily to provide easy customization of the spa experience. In particular, in some cases, jet packs having desired nozzle configurations can be easily retrofit into an existing spa. In addition, the jet packs also allow for easy repair in the event of leaking or improper functioning of the nozzles, simply by removing the damaged jet pack and installing a new one in the seating position.

Figure 18:
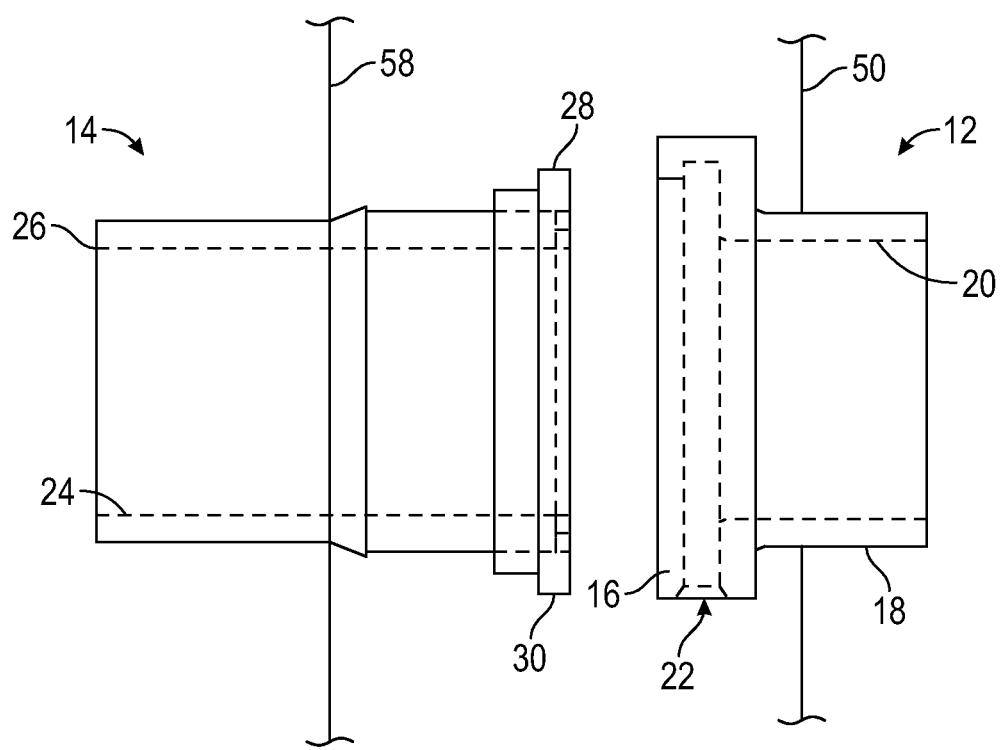
FIG. 18 is a side elevational view illustrating connection of a jet pack to a water supply manifold using the through bulkhead connector of FIG. 1.
Figure 19:
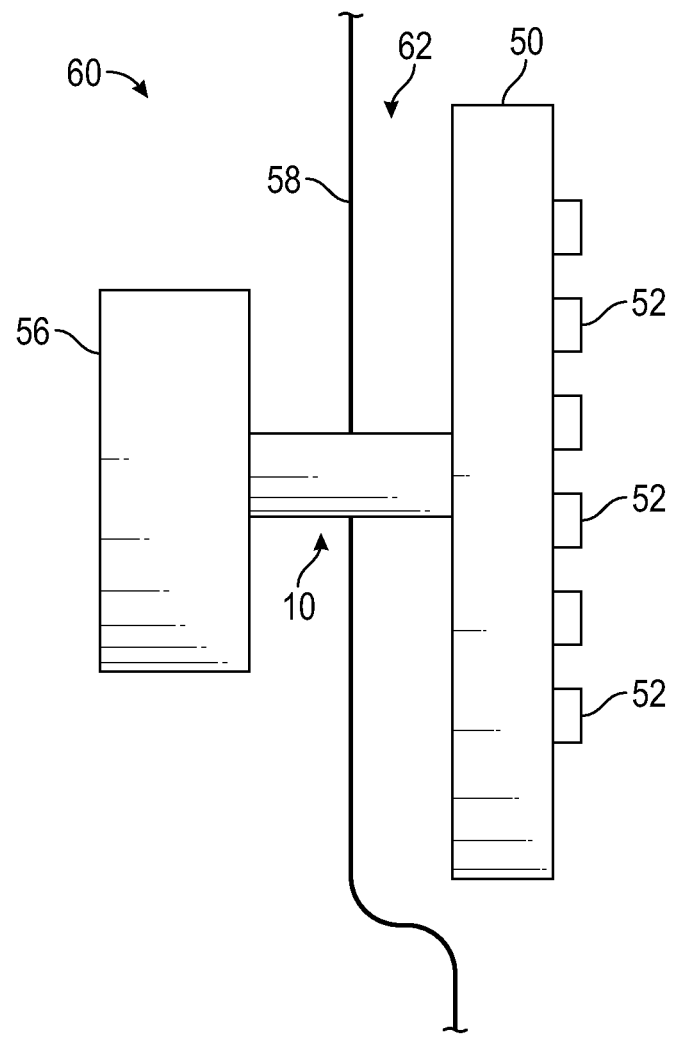
FIG. 19 is a simplified schematic illustration showing connection of a jet pack to a water supply manifold using the through bulkhead connector of FIG. 1.

FIGS. 18 and 19 more clearly illustrate how the through bulkhead connector 10 of the present invention enables the functionality described above. In particular, as shown therein, in an embodiment, the first fitting member 12 of the through bulkhead connector 10 is connected to or is otherwise integrated with the jet pack 50 having a plurality of nozzle 52 (e.g., air and/or water nozzles) on a front face thereof. The second fitting member 14 is connected to a fluid supply manifold such as, for example, a water supply manifold 56 positioned behind the shell 58 of the spa 60. As shown in FIGS. 18 and 19, the second fitting member 14 extends through the shell 58 of the spa 60 at the seating position 62. In an embodiment, a fluid tight seal is formed between the fitting 14 and the shell 58 using, for example, an O-ring, grommet or other sealing means.

Installation of jet pack 50 in the seating position 62 in the shell 58 of the spa 60 is therefore effected by slidable receiving the flange or shoulder 30 of the second fitting member 14 within the slot 22 of the flange of the first fitting member 12. O-ring 54 seated in annular channel 32 in face 28 of the second fitting 14 therefore forms a fluid tight seal between the first fitting member 12 and second fitting member 14. In this position, passages 20, 24 are aligned so that fluid communication is provided between the fluid supply manifold 56 and the interior of the jet pack 50 and nozzles 52 thereof. While FIGS. 18 and 19 illustrate that the first fitting member 12 is interconnected with the jet pack 50 and the second fitting member is fluidly connected to the supply manifold 56 and extends through the shell 58, in another embodiment the components may be reversed such that the first fitting 12 extends through the spa shell 58 and is fluidly connected to the fluid supply manifold 56, and the second fitting 14 is connected to the jet pack 50. In such case, the adapter 16 extends through the shell 58 such that the flange 16 and slot 22 are positioned on the inside/interior of the shell 58. The jet pack 50 may then be connected to the supply manifold 56 by receiving the shoulder 30 of the second fitting member 14 in the slot 22. In either case, simple and easy fluid connection of the jet pack 50 with the water supply manifold 56 is provided.

In an embodiment, the outside diameter of the external adapter 18 of the through bulkhead connector 10 may be 1.5 inches or 2 inches for interconnection with respective hard PVC plumbing fittings of a spa or hot tub. As indicated above, in one embodiment, the external adapter 18 feeds through the spa shell/tub wall and is sealed in the tub wall by a grommet that has sufficient tightness to not allow water to leak from the tub to the outside. As indicated above, the inside part of this fitting is designed to slide onto a flange built into the through bulkhead side of the fitting. There is an O-ring that is tolerenced such that when the two parts (the first fitting member 12 and the second fitting member 14) are assembled, provides a seal between the two parts not allowing water to leak up and in excess of 60 psi. The part is laterally slid over the bulkhead to engage the coupling to allow for the transfer of water from outside the tub to the jet arrays inside the jet seatback. This provides for easy assembly of the jet seat into place inside the jet seat cavity in the spa and provides the main feed of pressurized water to the jet array.

Figure 20:
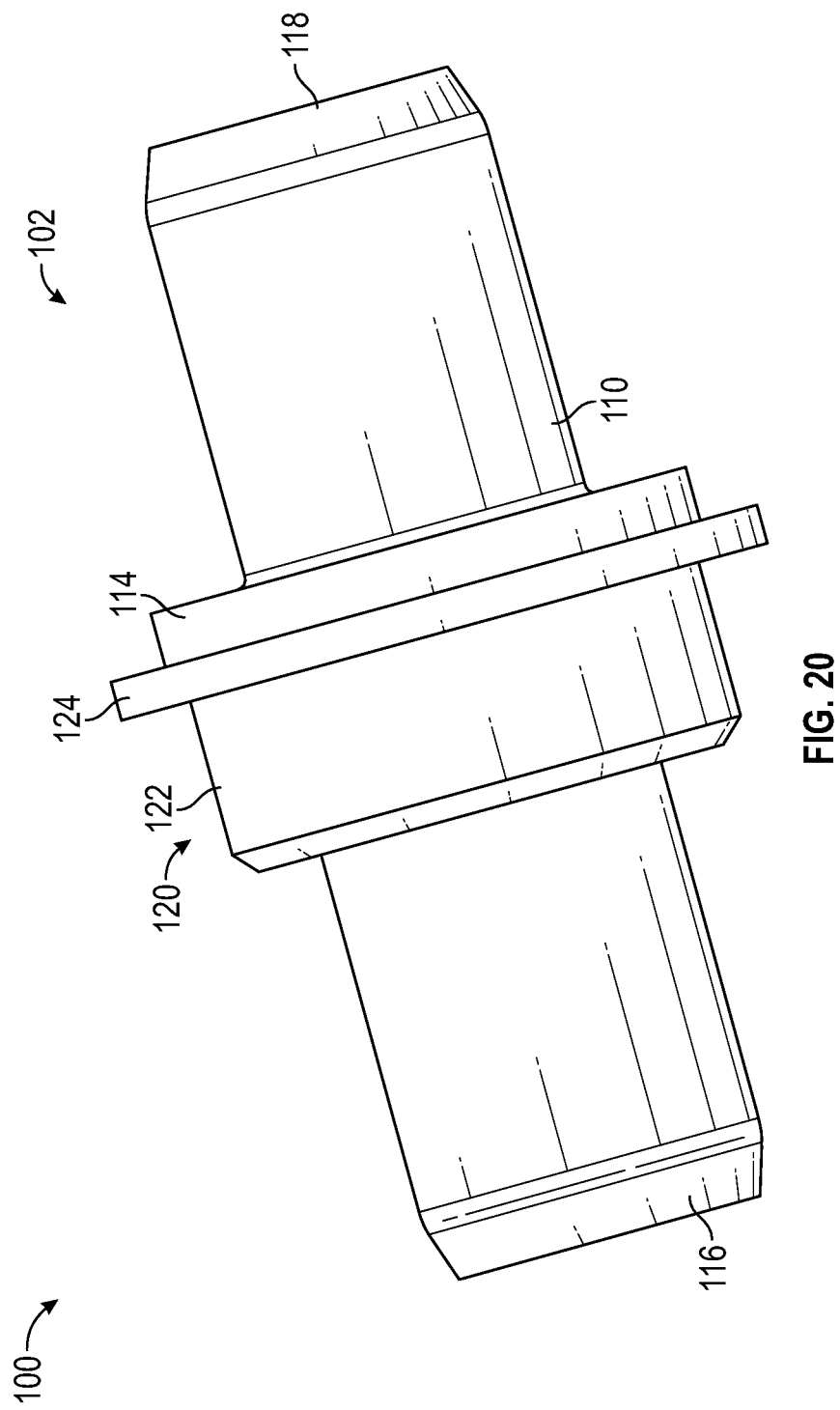
FIG. 20 is a perspective view of a through bulkhead connector according to another embodiment of the present invention.
Figure 21:
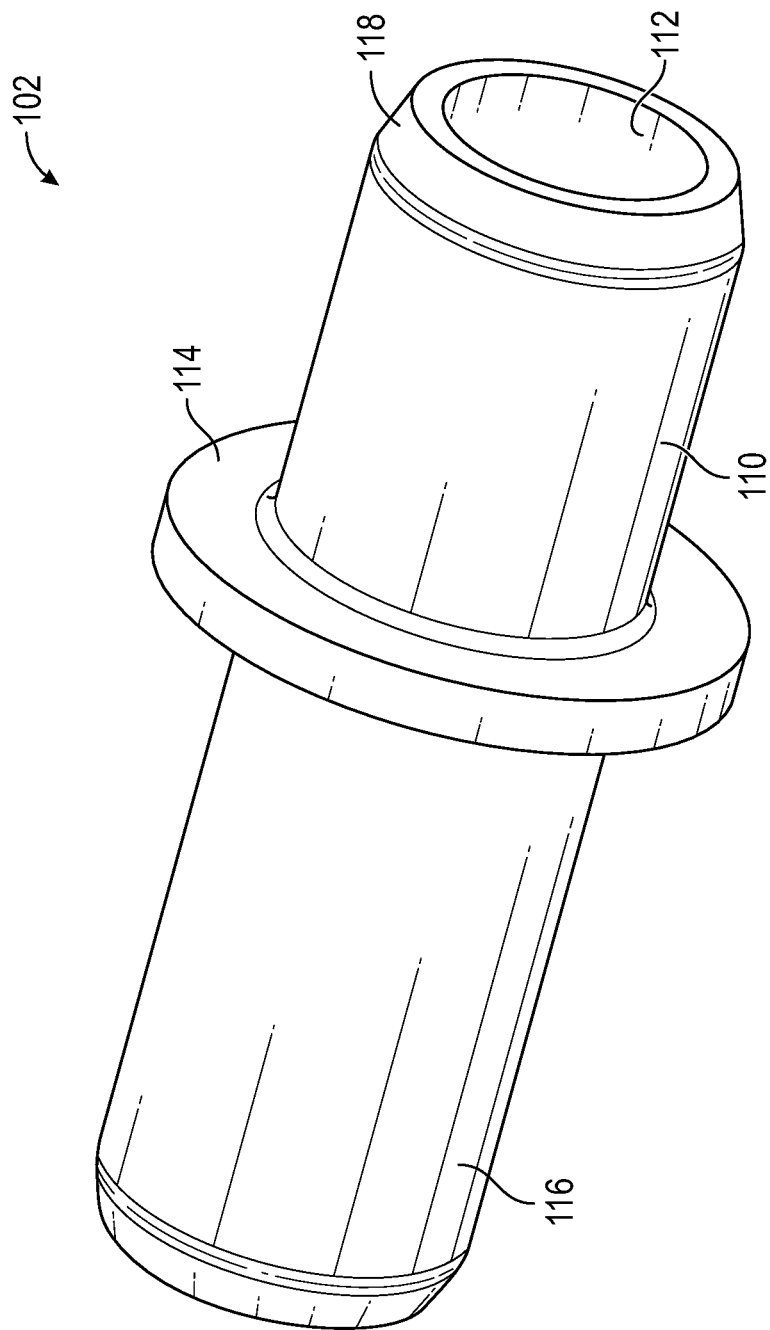
FIG. 21 is a perspective view of a first fitting of the through bulkhead connector of FIG. 20.
Figure 22:
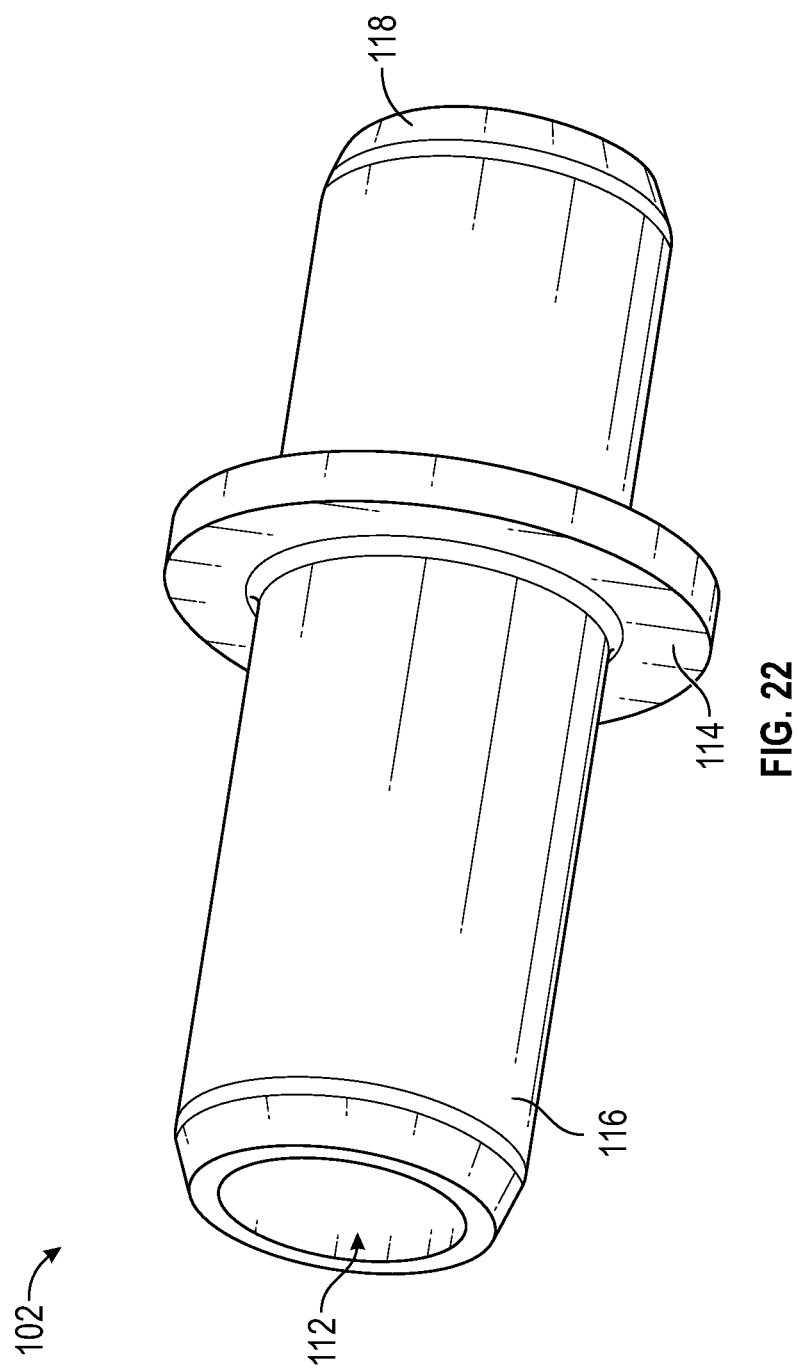
FIG. 22 is another perspective view of the first fitting.
Figure 23:
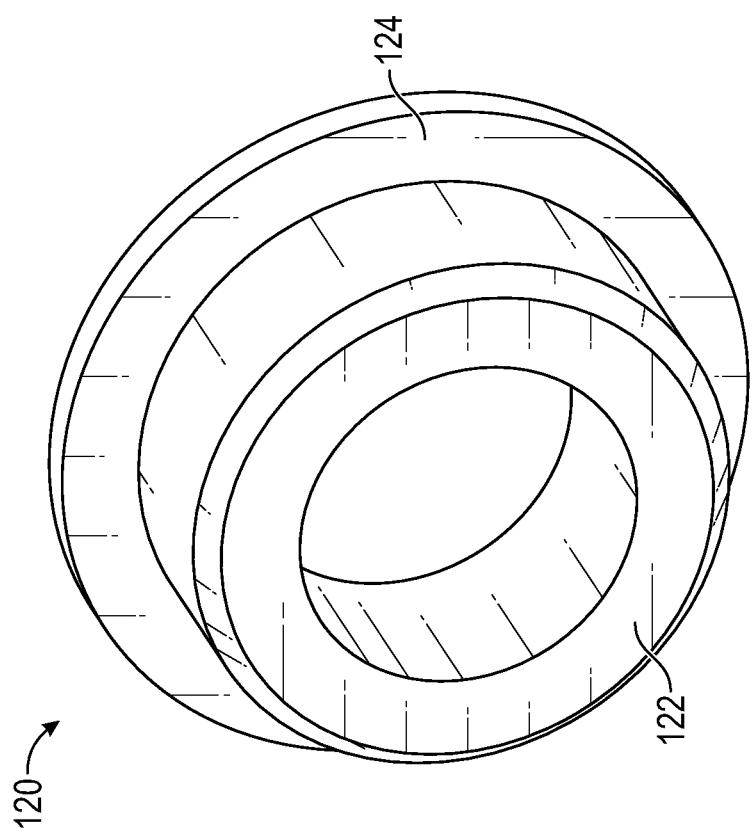
FIG. 23 is a perspective view of a grommet of the through bulkhead connector of FIG. 20.
Figure 24:
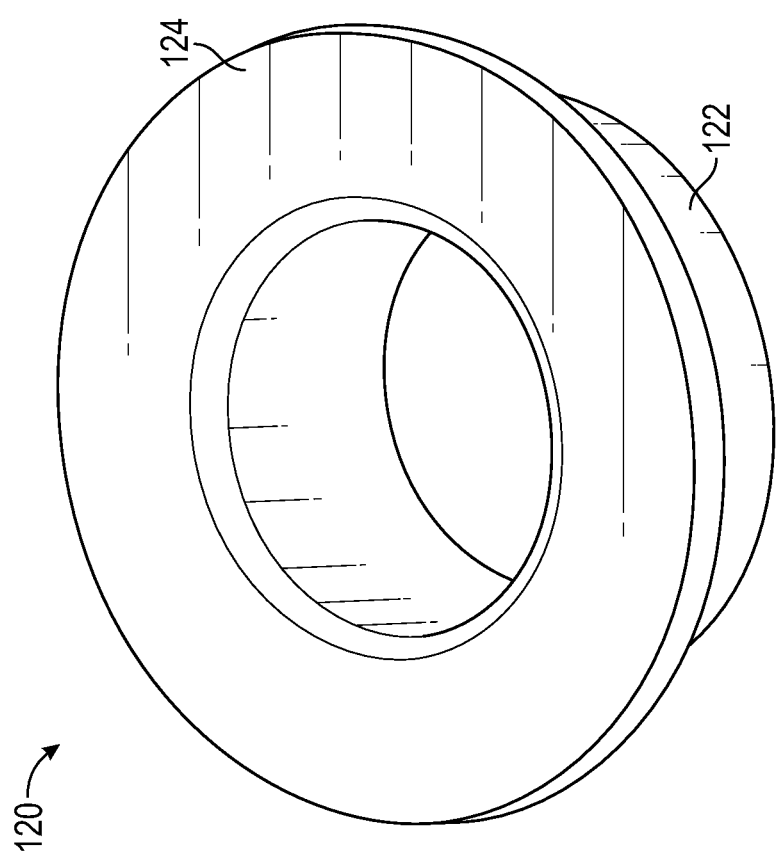
FIG. 24 is another perspective view of the grommet of FIG. 23.

Referring to FIG. 20, a through bulkhead connector 100 according to another embodiment of the present invention is illustrated. As shown in FIGS. 20-22, the through bulkhead connector 100 includes a first fitting member 102 having a generally cylindrical body portion 110 defining a hollow passageway 112 therethrough, and an annular flange 114 extending generally perpendicularly from the body portion 110. The body portion 110 includes a first connector end 116 on one side of the flange 114, and a second connector end 118 on an opposite side of the flange 114. As shown in FIGS. 20, 23 and 24, the through bulkhead connector 100 also includes a grommet 120 having a generally hollow sleeve 122 and an annular flange 124. The hollow sleeve 122 is dimensioned so as to closely fit over the first connector end 116 of the body portion 110 of the first fitting member 102 such that the flange 124 of the grommet 120 abuts the flange 114 of the first fitting member.

In an embodiment, the through bulkhead connector allows for a ¾" hose to be attached to it on the inside of the spa shell/tub (water side), feeds through the wall of the tub and connects to a ¾" air hose on the outside for the tub for the purpose of diverting air out or into the spa to be used for distributing to jet arrays either in the seat inserts or in the lounger area external jets. In an embodiment, this fitting has extended barbs to allow for either smooth, soft, or hard coil containing PVC tubing to be mounted to it. It provides a seal through the tub wall thickness by the grommet so that no water leaks from the tub to the outside.

Figure 25:
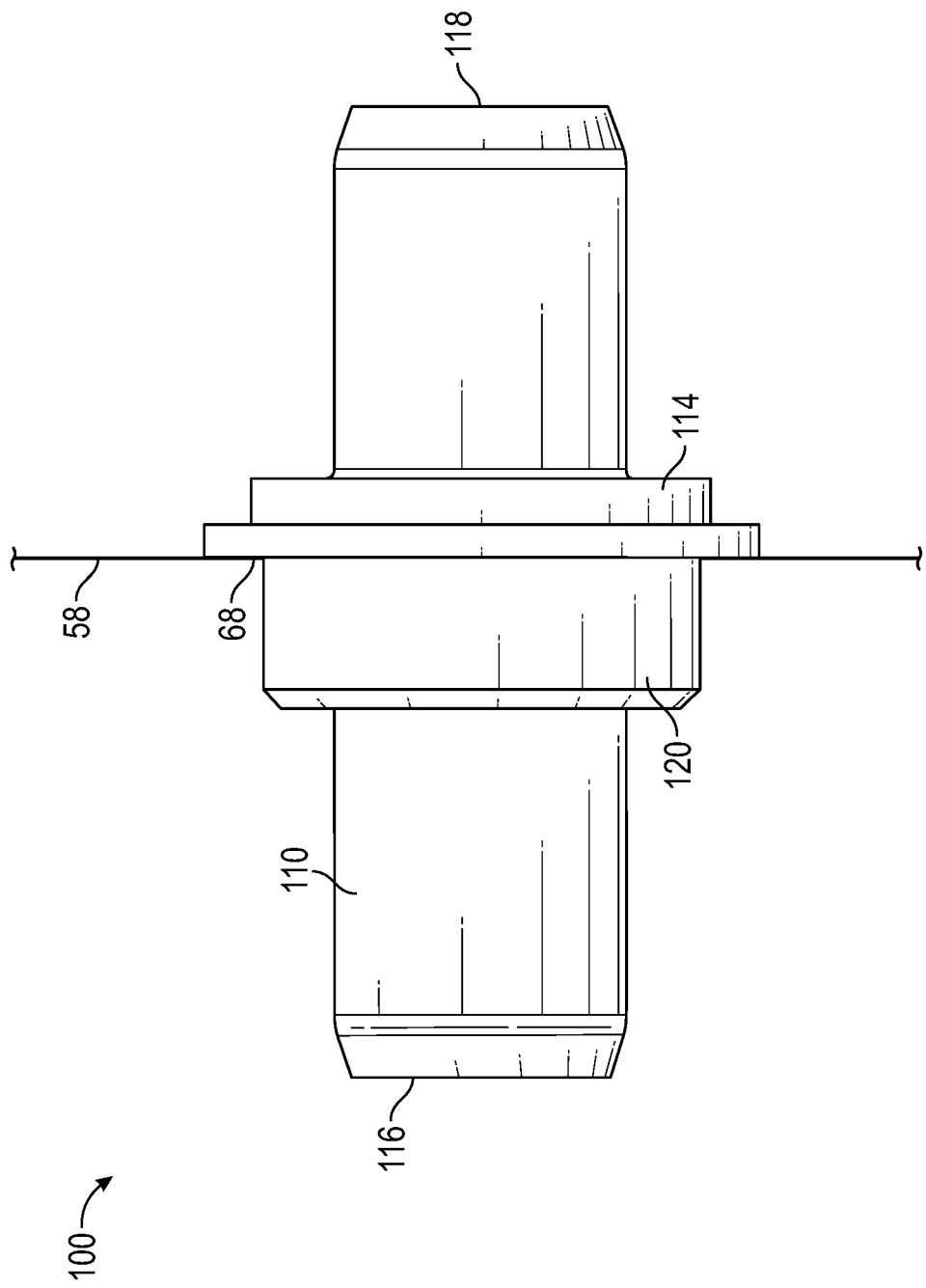
FIG. 25 is a simplified schematic illustration showing connection of a jet pack to a water supply manifold using the through bulkhead connector of FIG. 1.

FIG. 25 illustrates use of the of the through bulkhead connector with a spa and shell 58 thereof, as described above. As shown therein, the grommet 120 is positioned on the body portion 110 of the first fitting member 102 such that the interior of the sleeve 122 of the grommet 120 searingly engages the outer surface of the body portion and the flange 124 sealingly engages the flange 114 of the fitting 102. The body portion 110 is positioned in a hole 68 in the spa shell 58 (e.g., a hole in a seating position of the spa shell) such that the sleeve 122 of the grommet 120 is received in the hole 68, and such that the flange 124 engages the sidewall of the shell 58 surrounding the hole 68 to create a fluid tight seal therewith. In an embodiment, first connector end 116 can then be connected with an air supply manifold (not shown) positioned behind the spa shell 58, and the second connector end 118 can be fluidly connected to a jet pack, such as that shown in FIGS. 18 and 19, so that air can be supplied from the air supply to the jet pack. In an embodiment, the through bulkhead connector 100 can be connected to the jet pack prior to inserting the connector 100 through the hole 68 in the spa shell.

It is contemplated that the through bulkhead connectors 10, 100 disclosed herein may be utilized in concert with one another to provide fluid connections between a water supply and air supply positioned behind the spa shell, and a jet pack positioned interior to the spa shell, respectively.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A through bulkhead connector for a spa, comprising:
   a first fitting member having a flange with a first face and a second face opposing the first face and an adapter portion extending outward from the first face of the flange and defining a first passageway through the adapter portion and the flange from the first face to the second face, wherein the flange includes a U-shaped rib formed on an outer periphery of the second face and an overhang portion formed on all of the U-shaped rib that extends inward over the second face to define a central planar surface formed about the first passageway that is bounded by the U-shaped rib with a U-shaped slot formed in the flange underneath the overhang portion, the planar surface extending uniformly from an open-ended portion of the U-shaped rib about the first passageway to an inner wall of the U-shaped rib, with an entry to the U-shaped slot accessed through the open-ended portion of the U-shaped rib, the flange being integral with the adapter portion such that a position of the flange is fixed with respect to the adapter portion; and a second fitting member including a cylindrical body portion having a first end and a second end with a second passageway formed through the cylindrical body portion from the first end to the second end, and a shoulder adjacent to the second end, the shoulder including a first shoulder segment at the second end and a second shoulder segment formed on the first shoulder segment, the first shoulder segment having a diameter larger than a diameter of the second shoulder segment, the shoulder being slidably receivable in the U-shaped slot in the flange of the first fitting member, wherein an axial end face of the first shoulder segment is slidably receivable in the U-shaped slot at the open-ended portion of the U-shaped rib, the axial end face of the first shoulder segment traveling transversely and directly across the planar surface, over the first passageway and along the inner wall of the U-shaped rib until further movement through the U-shaped slot is impeded by the U-shaped rib, the axial end face of the first shoulder segment secured therein by the overhang portion, and wherein the second shoulder segment travels along an inner wall of the overhang portion of the U-shaped rib as the first shoulder segment is inserted in the U-shaped slot at the open-ended portion and slid transversely and directly across the planar surface, a side surface of a portion of the second shoulder segment abutting against a side surface of the overhang portion upon full insertion of the first shoulder segment in the U-shaped slot without further movement therein, the shoulder being integral with the cylindrical body portion such that a position of the shoulder is fixed with respect to the cylindrical body portion;

wherein when the second fitting member is slidably connected to the first fitting member, the first passageway and the second passageway are in alignment with one another to allow for fluid flow through the first fitting member and the second fitting member; and wherein a closed end of the U-shaped slot in the flange serves as a position stop restraining sliding movement of the shoulder of the second fitting member within the slot and functions to ensure alignment of the first passageway with the second passageway.

2. The through bulkhead connector of claim 1, further comprising:
an annular channel formed in an axial face of the second fitting member at the second end.

3. The through bulkhead connector of claim 2, further comprising:
a seal element positioned in the annular channel;
wherein when the second fitting member is connected to the first fitting member, the seal element contacts an axial face of the first fitting member surrounding the first passageway.

4. The through bulkhead connector of claim 1, wherein:
the U-shaped slot and the flange are configured to prevent decoupling of the first fitting member from the second fitting member via an axial force exerted on either of the first fitting member or second fitting member.

5. The through bulkhead connector of claim 1, wherein:
the first fitting member is configured for fluid connection with one of a water supply manifold and a jet pack having a plurality of nozzles; and
the second fitting member is configured for fluid connection with the other of the water supply manifold and the jet pack.

6. The through bulkhead connector of claim 1, wherein:
the first fitting member is configured for fluid connection with a jet pack having a plurality of nozzles; and
the second fitting member is configured for fluid connection with a water supply manifold positioned behind a shell of a spa.

7. A spa, comprising:
a shell configured to contain a volume of water;
a water supply manifold positioned behind the shell;
a jet pack having an array of nozzles for directing pressurized jets of water and/or air into the volume of water; and
a through bulkhead connector extending through the shell and fluidly interconnecting the water supply manifold with the jet pack, the through bulkhead connector having a first fitting member having a flange with a first face and a second face opposing the first face, a U-shaped rib formed on an outer periphery of the second face and an overhang portion formed on all of the U-shaped rib that extends inward over the second face to define a central planar surface formed about a first passageway that is bounded by the U-shaped rib with a U-shaped slot formed in the flange underneath the overhang portion, the planar surface extending uniformly from an open-ended portion of the U-shaped rib about the first passageway to an inner wall of the U-shaped rib, with an entry to the U-shaped slot accessed through the open-ended portion of the U-shaped rib, and an adapter portion extending outward from the first face of the flange and defining the first passageway through the adapter portion and the flange from the first face to the second face, the flange being integral with the adapter portion, and a second fitting member including a cylindrical body portion having a first end and a second end with a second passageway formed through the cylindrical body portion from the first end to the second end, and a shoulder adjacent to the second end, the shoulder including a first shoulder segment at the second end and a second shoulder segment formed on the first shoulder segment, the first shoulder segment having a diameter larger than a diameter of the second shoulder segment, the shoulder being integral with the cylindrical body portion;
wherein the shoulder of the second fitting member being slidably receivable in the U-shaped slot in the flange of the first fitting member for connecting the second fitting member with the first fitting member, wherein an axial end face of the first shoulder segment is slidably receivable in the U-shaped slot at the open-ended portion of the U-shaped rib, the axial end face of the first shoulder segment traveling transversely and directly across the planar surface, over the first passageway and along the inner wall of the U-shaped rib until further movement through the U-shaped slot is impeded by the U-shaped rib, the axial end face of the first shoulder segment secured therein by the overhang portion, and wherein the second shoulder segment travels along an inner wall of the overhang portion of the U-shaped rib as the first shoulder segment is inserted in the U-shaped slot at the open-ended portion and slid transversely and directly across the planar surface, a side surface of a portion of the second shoulder segment abutting against a side surface of the overhang portion upon full insertion of the first shoulder segment in the U-shaped slot without further movement therein, and wherein a closed end of the U-shaped slot in the flange functions as a position stop restraining sliding movement of the shoulder portion of the second fitting member within the slot.

8. The spa of claim 7, wherein:
when the second fitting member is slidably connected to the first fitting member, the first passageway and the second passageway are in alignment with one another to allow for fluid flow from the water supply manifold to the jet pack through the first fitting member and the second fitting member.

9. The spa of claim 7, wherein:
the first fitting member is connected to the jet pack; and
the second fitting member is connected to the water supply manifold.

10. The spa of claim 7, wherein:
the first fitting member is connected to the water supply manifold; and
the second fitting member is connected to the jet pack.

11. The spa of claim 8, wherein:
the shoulder being shaped and dimensioned to be received in the U-shaped slot in the flange of the first fitting member.

12. The spa of claim 11, further comprising:
an annular channel formed in an axial face of the second fitting member at the second end.

13. The spa of claim 12, further comprising:
a seal element positioned in the annular channel;
wherein when the second fitting member is connected to the first fitting member, the seal element contacts an axial face of the first fitting member surrounding the first passageway to form a fluid-tight seal between the first fitting member and the second fitting member.

14. The spa of claim 13, further comprising:
an air supply manifold positioned behind the shell; and
a second through bulkhead connector extending through the shell and fluidly interconnecting the air supply manifold with the jet pack.

15. The spa of claim 14, wherein:
the second through bulkhead connector includes a first fitting element having a hollow body portion and an annular flange extending from the hollow body portion, and a grommet receivable on the hollow body portion and having an annular flange;
wherein the grommet is receivable in an aperture in the shell of the spa such that the annular flange of the grommet forms a fluid-tight seal with the shell.

16. A method of fluidly connecting a jet pack having an array of nozzles with a water and/or air supply manifold, comprising the steps of:
providing a water and/or air supply manifold with a first fitting member having a flange with a first face and a second face opposing the first face, a U-shaped rib formed on an outer periphery of the second face and an overhang portion formed on all of the U-shaped rib that extends inward over the second face to define a central planar surface formed about a first passageway that is bounded by the U-shaped rib with a U-shaped slot formed in the flange underneath the overhang portion, the planar surface extending uniformly from an open-ended portion of the U-shaped rib about the first passageway to an inner wall of the U-shaped rib, with an entry to the U-shaped slot accessed through the open-ended portion of the U-shaped rib, and an adapter portion extending outward from the first face of the flange and defining the first passageway through the adapter portion and the flange from the first face to the second face;
providing a jet pack having an array of nozzles with a second fitting member including a cylindrical body portion having a first end and a second end with a second passageway formed through the cylindrical body portion from the first end to the second end, and a shoulder adjacent to the second end, the shoulder including a first shoulder segment at the second end and a second shoulder segment formed on the first shoulder segment, the first shoulder segment having a diameter larger than a diameter of the second shoulder segment; and
sliding the shoulder of the second fitting member into the U-shaped slot in the flange of the first fitting member to align the first passageway and the second passageway so as to provide fluid communication between the water and/or air supply manifold with the jet pack, wherein an axial end face of the first shoulder segment is slidably receivable in the U-shaped slot at the open-ended portion of the U-shaped rib, the axial end face of the first shoulder segment traveling transversely and directly across the planar surface, over the first passageway and along the inner wall of the U-shaped rib until further movement through the U-shaped slot is impeded by the U-shaped rib, the axial end face of the first shoulder segment secured therein by the overhang portion, and wherein the second shoulder segment travels along an inner wall of the overhang portion of the U-shaped rib as the first shoulder segment is inserted in the U-shaped slot at the open-ended portion and slid transversely and directly across the planar surface, a side surface of a portion of the second shoulder segment abutting against a side surface of the overhang portion upon full insertion of the first shoulder segment in the U-shaped slot without further movement therein;
wherein the flange of the first fitting member is integral with the adapter portion of the first fitting member;
wherein the shoulder of the second fitting member is integral with the cylindrical body portion of the second fitting member; and
wherein the U-shaped slot in the flange includes a closed end that serves as a position stop restraining sliding movement of the shoulder of the second fitting member within the slot.

\* \* \* \* \*